United States Patent [19]

Vogel et al.

[11] Patent Number: 5,482,655
[45] Date of Patent: Jan. 9, 1996

[54] ELECTRICALLY CONDUCTIVE THERMOPLASTIC POLYMER FORMULATIONS AND THE USE THEREOF

[75] Inventors: Thomas Vogel; Jürgen Finter; Hartmut Bleier, all of Freiburg, Germany; Patrice Bujard, Courtepin, Switzerland

[73] Assignee: Ciba-Geigy Corporation, Tarrytown, N.Y.

[21] Appl. No.: 75,658

[22] Filed: Jun. 11, 1993

[30] Foreign Application Priority Data

Jun. 17, 1992 [CH] Switzerland .................... 1906/92

[51] Int. Cl.$^6$ ................. H01B 1/00; H01B 1/06; H01B 1/12
[52] U.S. Cl. ............... 252/500; 528/373; 528/377; 528/378; 528/422
[58] Field of Search ................ 252/500; 528/373, 528/377, 378, 422

[56] References Cited

U.S. PATENT DOCUMENTS

| | | | |
|---|---|---|---|
| 4,910,645 | 3/1990 | Jonas et al. | 361/525 |
| 4,959,430 | 9/1990 | Jonas et al. | 526/257 |
| 4,987,042 | 1/1991 | Jonas et al. | 429/213 |
| 5,035,926 | 7/1991 | Jonas et al. | 427/393.1 |
| 5,061,401 | 10/1991 | Wernet et al. | 252/500 |
| 5,185,100 | 2/1993 | Han et al. | 252/500 |
| 5,206,297 | 4/1993 | Wernet et al. | 252/500 |
| 5,213,714 | 5/1993 | Kampf et al. | 252/500 |

FOREIGN PATENT DOCUMENTS

| | | |
|---|---|---|
| 339340 | 11/1989 | European Pat. Off. . |
| 440957 | 8/1991 | European Pat. Off. . |
| 3804520 | 8/1989 | Germany . |
| 3813589 | 11/1989 | Germany . |
| 3843412 | 6/1990 | Germany . |

OTHER PUBLICATIONS

Chem. Abst. 113: 118422v (1990).
Derw. Abst. 90–033555/05.
Chem. Abst. 115 (22): 234808q of EP 440,957 Aug. 1991.
Chem. Abst. 89–317232/44 of EP 339,340, Nov. 1989.
DE 3,813,589 Nov. 1989 and DE 3,843,412 Jun. 1990.
Chem. Abst. 89–242923/34 of DE 3,804,520 Aug. 24, 1989.

Primary Examiner—Linda Skaling Therkorn
Assistant Examiner—M. Kopec
Attorney, Agent, or Firm—George R. Dohmann

[57] ABSTRACT

A formulation comprising
a) at least one polythiophene in oxidised polycationic form and containing structural repeating units of formula I

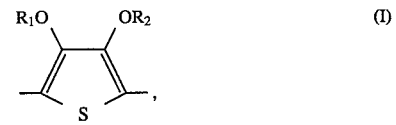

wherein $R_1$ and $R_2$ are each independently of the other linear or branched $C_1$–$C_{18}$alkyl or $C_2$–$C_{18}$alkoxyalkyl; or are $C_3$–$C_8$cycloalkyl, phenyl or benzyl which are unsubstituted or substituted by $C_1$–$C_6$alkyl, $C_1$–$C_6$alkoxy or halogen; or $R_1$ and $R_2$, taken together, are linear $C_1$–$C_8$alkylene which is unsubstituted or substituted by $C_1$–$C_6$alkyl, $C_1$–$C_6$alkoxy, halogen, $C_3$–$C_8$cycloalkyl, phenyl, benzyl, $C_1$–$C_4$alkylphenyl, $C_1$–$C_4$alkoxyphenyl, halophenyl, $C_1$–$C_4$alkylbenzyl, $C_1$–$C_4$alkoxybenzyl or halobenzyl; and b) at least one polyanion of a film-forming thermoplastic polymer containing sulfated alcohol groups

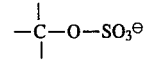

and/or sulfonatoalkylated alcohol groups

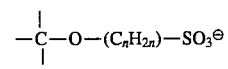

in structural repeating units, wherein the group —($C_nH_{2n}$)— is linear or branched $C_2$–$C_{12}$alkylene which contains 2 to 5 carbon atoms in the carbon chain and is unsubstituted or substituted by $C_1$–$C_4$alkoxy. The formulation is an intrinsically electrically conductive themoformable material.

61 Claims, No Drawings

ELECTRICALLY CONDUCTIVE THERMOPLASTIC POLYMER FORMULATIONS AND THE USE THEREOF

The present invention relates to formulations comprising a) an oxidised polycationic polythiophene which is substituted by alkoxy in the 3,4-positions, and b) at least one polyanion of a thermoplastic polymer containing sulfated alcohol groups

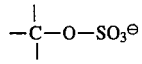

and/or sulfonatoalkylated alcohol groups

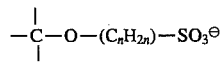

in structural repeating units, to the preparation of said formulations, to the use of these formulations for fabricating electrically conductive moulded articles, and to the use of finely particulate electrically conductive formulations as fillers for thermoplastic materials.

It is known that electrically conductive salts of polycationic polyheteroaromatic compounds are obtained by eelctrochemical polymerisation of heteroaromatic compounds. The mechanical, and often also the electrical, properties of such salts of polyheteroaromatic compounds, which are normally deposited on anodes as a film, are unsatisfactory for many utilities.

DE-A-3 804 520 discloses electrically conductive polymers in the form of self-supporting films consisting of structural units of a 3-alkoxy-4-alkylthiophene that is doped with low molecular anions such as hexafluorophosphate or tosylate. The filme are said to chemically stable and heat-resistant. They have good electrical properties, as is to be expected of doping with low molecular anions. A considerable drawback is the brittleness of the films, which have no thermoplastic properties.

DE-A-3 804 523 discloses soluble electrically conductive polymers which contain structural units of a thiophene that is substituted in 3-position with a $C_6$–$C_{30}$alkoxy group and is doped with low molecular anions such as hexafluorophosphate or tosylate, and which is especially suitable for coating purposes.

EP-A-0 339 340 discloses electrically conductive polymers in the form of antistatic coatings on plastics materials that consist of structural units of a thiophene which is substituted in the 3,4-positions with alkylenedioxyl and are doped with low molecular anions such as hexafluorophosphate or tosylate. No mention is made of the mechanical and thermoplastic properties of the films deposited on electrodes.

EP-A-0 440 957 discloses electrically conductive polymers in the form of dispersions based on structural units of hydroxyl- or alkoxy-substituted thiophenes and a polymeric polyanion such as polyacrylic acid or polystyrenesulfonic acid, and which are used as antistatic coating materials.

U.S. Pat. No. 5,061,401 discloses electrically conductive polymers in the form of films that are based on unsubstituted or alkyl-substituted structural units of heteroaromatic compounds such as thiophene and polyanions of sulfated polymers. These compositions have good electrical conductivity and thermoplastic properties. For example, the electrical conductivity can be enhanced by stretching. The relatively low conductivity to be expected of unsubstituted thiophenes is measured for the composition of Example 5. EP-A-0 446 172 discloses moulding materials and fillers containing these electrically conductive polymers.

It has now been found that surprisingly high electrical conductivities and excellent thermoplastic properties can also be obtained with formulations containing oxidised polyanionic thiophenes by using alkoxy-substituted thiophenes and carrying out the oxidative polymerisation in the presence of sulfated or sulfonatoalkylated polymers. Compared with similar compositions containing polypyrroles and unsubstituted polythiophenes, and even with alkoxy-substituted polythiophenes containing low molecular anions, the electrical conductivity is surprisingly increased and higher than expected. The compositions also have greatly enhanced resistance to the action of air, moisture and/or heat (oxidation resistance) and hence a noticeably increased service life without any essential loss of conductivity. Furthermore, the mechanical stability, for example the tensile strength or ultimate strength as well as the elongation at break, is substantially enhanced. Stretching can be carded out even at room temperature and not only in the range of the glass transition temperature. The elongation can be 100% and more. With stretching the mechanical stability and the electrical conductivity can be increased by about up to four or five times the base conductivity. With the novel compositions it is possible to prepare even self-supporting mechanically stable and translucent films for the range of c. 1 μm having high electrical conductivities and suitable for electrooptical utilities. A very substantial advantage is also that the electrical conductivities can be selectively adjusted by choice of the polyanion and by a stretching and matched to different utilities.

In one of its aspects, the invention relates to a formulation comprising a) at least one polythiophene in oxidised polycationic form and containing structural repeating units of formula I

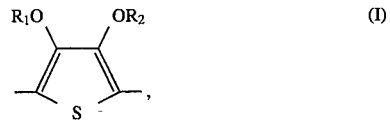

wherein $R_1$ and $R_2$ are each independently of the other linear or branched $C_1$–$C_{18}$alkyl or $C_2$–$C_{18}$alkoxyalkyl; or are $C_3$–$C_8$cycloalkyl, phenyl or benzyl which are unsubstituted or substituted by $C_1$–$C_6$alkyl, $C_1$–$C_6$alkoxy or halogen; or $R_1$ and $R_2$, taken together, are linear $C_1$–$C_6$alkylene which is unsubstituted or substituted by $C_1$–$C_6$alkyl, $C_1$–$C_6$alkoxy, halogen, $C_3$–$C_8$cycloalkyl, phenyl, benzyl, $C_1$–$C_4$alkylphenyl, $C_1$–$C_4$alkoxyphenyl, halophenyl, $C_1$–$C_4$alkylbenzyl, $C_1$–$C_4$alkoxybenzyl or halobenzyl; and b) at least one polyanion of a film-forming thermoplastic polymer containing sulfated alcohol groups

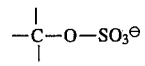

and/or sulfonatoalkylated alcohol groups

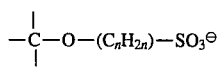

in structural repeating units, wherein the group —($C_nH_{2n}$)— is linear or branched $C_2$–$C_{12}$alkylene which contains 2 to 5 carbon atoms in the carbon chain and is unsubstituted or substituted by $C_1$–$C_4$alkoxy.

$R_1$ and $R_2$ defined as alkyl are preferably $C_1$–$C_{12}$alkyl, more particularly $C_1$–$C_8$alkyl and, most preferably, $C_1$–$C_4$alkyl. Typical examples are methyl, ethyl and the isomers of propyl, butyl, pentyl, hexyl, heptyl, octyl, nonyl, decyl, uncecyl, dodecyl, tetradecyl, hexadecyl and octadecyl. Preferred alkyl radicals are methyl, ethyl, n- and iso-propyl, n-, iso- and tert-butyl, and also n-pentyl and n-hexyl.

$R_1$ and $R_2$ defined as alkoxyalkyl are preferably $C_1$–$C_{17}$alkoxymethyl and $C_1$–$C_{16}$alkoxyethyl, preferably $C_1$–$C_{12}$alkoxymethyl and $C_1$–$C_{12}$alkoxyethyl, more particularly $C_1$–$C_4$alkoxymethyl and $C_1$–$C_7$alkoxyethyl and, most preferably, $C_1$–$C_4$alkoxymethyl and $C_1$–$C_4$alkoxyethyl. Typical preferred examples are methoxymethyl, ethoxymethyl, n- or isopropoxymethyl, n-, iso- or tert-butoxymethyl, methoxyethyl, ethoxyethyl, n- or isopropoxyethyl, n-,iso- and tert-butoxyethyl. $R_1$ and $R_2$ defined as cycloalkyl are preferably $C_5$–$C_6$cycloalkyl, typically cyclopentyl and cyclohexyl.

Substituents of cycloalkyl, phenyl and benzyl are preferably $C_1$–$C_4$alkyl, $C_1$–$C_4$alkoxy, F, Cl and Br. Typical examples of alkyl and alkoxy are preferably methyl, ethyl, methoxy and ethoxy. Representative examples of such substituted radicals are methylcyclopentyl, methylcyclohexyl, methoxycyclohexyl, methylphenyl, dimethylphenyl, ethylphenyl, methoxyphenyl, dimethoxyphenyl, chlorophenyl, methylbenzyl, dimethylbenzyl, ethylbenzyl, methoxybenzyl, dimethoxybenzyl and chlorobenzyl.

In a preferred embodiment, $R_1$ and $R_2$, taken together, are alkylene, preferably $C_1$–$C_4$alkylene and, most preferably, $C_1$–$C_2$alkylene. Typical examples of alkylene are methylene, ethylene, 1,2- or 1,3-propylene, butylene, pentylene and hexylene.

Preferred substituents of $R_1$ and $R_2$ as alkylene are $C_1$–$C_6$alkyl, $C_1$–$C_6$alkoxy, cyclohexyl, phenyl and benzyl, typically methyl, ethyl, propyl, butyl, methoxy, ethoxy, cyclohexyl, phenyl and benzyl.

In a preferred subgroup, $R_1$ and $R_2$ are linear or branched $C_1$–$C_6$alkyl, preferably $C_1$–$C_4$alkyl, or $R_1$ and $R_2$ together are $C_1$–$C_4$alkylene, preferably $C_1$–$C_2$alkylene which is unsubstituted or substituted by 1 or 2 $C_1$–$C_6$alkyl groups or $C_1$–$C_6$alkoxy groups.

In a preferred embodiment, $R_1$ and $R_2$ are $C_1$–$C_2$alkylene which is unsubstituted or substituted by $C_1$–$C_6$alkyl or $C_1$–$C_6$alkoxy.

In a particularly preferred embodiment, $R_1$ and $R_2$ are a radical of formula —$CHR_a$—$CHR_b$—, wherein $R_a$ and $R_b$ are each independently of the other H or $C_1$–$C_6$alkyl, preferably methyl or ethyl.

In a very particularly preferred embodiment, the structural unit of formula I is a radical of formula

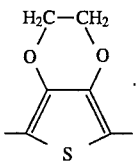

The novel formulation contains, per structural unit of the polythiophene, preferably 0.1 to 0.9, more particularly 0.1 to 0.6, most preferably 0.15 to 0.4, structural units containing sulfated alcohol groups

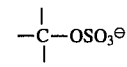

and/or sulfonatoalkylated alcohol groups

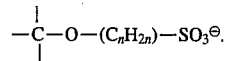

The group —($C_nH_{2n}$)— is preferably linear or branched $C_3$–$C_8$alkylene containing 3 to 5 carbon atoms in the carbon chain and is, most preferably, linear $C_3$–$C_5$alkylene. Typical examples of such alkylene groups are ethylene, methylethylene, dimethylethylene, 1,3-propylene, methyl-1,3-propylene, dimethyl-1,3-propylene, trimethyl-1,3-propylene, 1,4-butylene, methyl-1,4-butylene, dimethyl-1,4-butylene, trimethyl-1,4-butylene, tetramethyl-1,4-butylene, 1,3-or 1,5-pentylene and 1,3-, 1,4-, 1,5- or 1,6-hexylene. The gruppe —($C_nH_{2n}$)— is preferably trimethylene or tetramethylene. The thermoplastic polymer used in the novel composition and containing sulfated alcohol groups in salt form

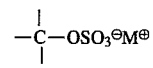

and/or sulfonatoalkylated alcohol groups in salt form

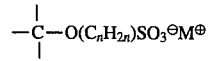

preferably has a glass transition temperature of −100° to 350° C., most preferably of −50° to 250° C., measured by the DSC method (differential scannning calorimetry). $M^{\ominus}$ is an alkali metal cation or an ammonium cation, which are described hereinafter in more detail with respect to the polymers.

The tensile strength of this thermoplastic polymer is preferably at least 5 MPa, most preferably at least 10 MPa, measured according to DIN 53 455. Depending on the type of polymer, the tensile strength can be up to 1000 MPa, preferably up to 500 MPa and, most preferably, up to 300 MPa. The degree of polymerisation can be typically up to 10 000, preferably from 10 to 5000 and, most preferably, from 10 to 1000.

The alcohol groups in the thermoplastic polymer may be partially or completely sulfated and/or sulfonatoalkylated. The ratio of free alcohol groups to sulfated alcohol groups

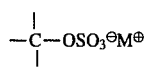

and/or sulfonatoalkylated alcohol groups

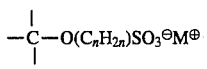

in the thermoplastic polymer may typically be from 50:1 to 1:50, preferably from 10:1 to 1:10.

In a preferred embodiment of the novel formulation, the thermoplastic polymer contains 5 to 100% molar, preferably 10 to 100% molar, more preferably 20 to 100% molar, still more preferably 30 to 100% molar and, most preferably, 30 to 90% molar, of structural units of sulfated alcohol groups

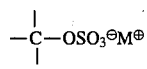

and/or sulfonatoalkylated alcohol groups

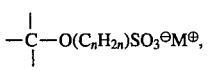

the remaining structural units being corresponding hydroxylated or non-hydroxylated structural units.

The sulfated and/or sulfonatoalkylated alcohol groups may be present as secondary groups

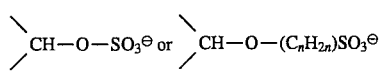

or as tertiary groups

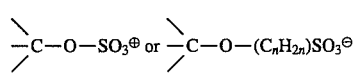

in the polymer backbone; or in side groups of the polymer as terminal primary groups —$CH_2$—O—$SO_3^\ominus$ or —$CH_2$—O—$(C_nH_{2n})SO_3^\ominus$, or as secondary groups

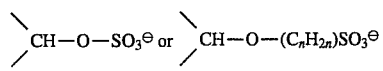

or as tertiary groups

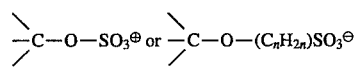

positioned centrally in the chain.

The thermoplastic polymers may be derived from polymers or mixtures thereof which contain different hydroxyl groups, typically polyesters, polyester amides, polycarbonates and polyimides obtained from hydroxyl group-containing monomers; saponified polymers of vinyl esters or ethers; hydroxylated polydiolefins such as polybutadiene, polyisoprene or chloroprene as well as their copolymers with olefinic monomers; polyacrylates or polymethacrylates containing hydroxyalkyl radicals in the ester moiety; polysiloxanes containing hydroxyalkyl groups; reduced polyketones or copolymers thereof; polyethers of glycidyl compounds and diols; polyvinyl phenols or copolymers of vinyl phenols and olefinic comonomers; as well as copolymers of vinyl alcohol, or hydroxylalkyl-containing acrylates or methacrylates, or hydroxylated diolefins with ethylenically unsaturated comonomers such as acrylonitriles, olefins, diolefins, vinyl chloride, vinylidene chloride, vinyl fluoride, vinylidene fluoride, styrene, α-methylstyrene, maleic anhydride, maleimide, vinyl ethers and vinyl esters.

The sulfated and/or sulfonatoalkylated thermoplastic polymers are preferably derived from polymers selected from the group consisting of polyadducts of glycidyl compounds containing on average more than one epoxy group with a diol; homopolymers and copolymers of hydroxyalkyl acrylates and methacrylates; homopolymers and copolymers of butadiene, isoprene and chloroprene in which the double bonds are hydroxylated; polyimides of hydrogenated ketotetracarboxylic acids, especially benzophenonetetracarboxylic acids; hydroxyalkyl polysiloxanes; and polyesters, polyamides, polyurethanes and polyimides from $C_4$–$C_{12}$alkenylenediols or $C_4$–$C_{12}$alkenylenediamines in which the double bond is hydroxylated.

The thermoplastic polymers are preferably either sulfated or sulfonatoalkylated.

The thermoplastic polymer may conveniently be an at least partially sulfated and/or sulfonatoalkylated polyadduct of a) a glycidyl compound containing on average more than epoxy group and b) a diol that contains

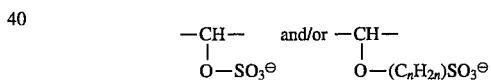

groups in the polymer chain, wherein the group —$C_nH_{2n}$— has the meanings previously assigned to it, including the preferred meanings.

The polyadducts are preferably derived from glycidyl compounds contianing on average two epoxy groups in the molecule.

Particularly suitable glycidyl compounds are those having two glycidyl groups bonded to a hetero atom (e.g. sulfur, preferably oxygen or nitrogen), β-methylglycidyl groups or 2,3-epoxycyclopentyl groups. Typical examples are preferably bis(2,3-epoxycyclopentyl) ether; diglycidyl ethers of polyhydric aliphatic alcohols, typically 1,4-butanediol, or polyalkylene glycols such as polypropylene glycols; diglycidyl ethers of cycloaliphatic polyols such as 2,2-bis(4-hydroxycyclohexyl)propane; diglycidyl ethers of polyhydric phenols such as resorcinol, bis(p-hydroxyphenyl)methane, 2,2-bis(p-hydroxyphenyl)propane (=diomethane), 2,2-bis(4'-hydroxy-3',5'-dibromophenyl)propane, 1,3-bis(p-hydroxyphenyl)ethane; bis(β-methylglycidyl) ethers of the above dihydric alcohols or dihydric phenols; diglycidyl esters of dicarboxylic acids such as phthalic acid, terephthalic acid, $\Delta_4$-tetrahydrophthalic acid and hexahydrophthalic acid, N,N-diglycidyl derivatives of primary mines and amides and heterocyclic nitrogen bases that carry two N-atoms, and N,N'-diglycidyl derivatives of disecondary diamides and diamines, including N,N-diglycidylaniline, N,N-diglycidyltoluidine, N,N-diglycidyl-p-aminophenyl methyl ether, N,N'-dimethyl-N,N'-diglycidylbis(p-aminophenyl)methane; N',N"-diglycidyl-N-phenylisocyanurate; N,N'-diglycidylethylene urea; N,N'-diglycidyl-5,5-dimethylhydantoin, N,N'-diglycidyl-5-isopropylhydantoin, N,N-methylenebis(N',N'-diglycidyl-5,5-dimethylhydantoin), 1,3-bis(N-glycidyl-5,5-dimethylhydantoin)-2-hydroxypropane; N,N'-diglycidyl-5,5-dimethyl-6-isopropyl-5,6-dihydrouracil, triglycidylisocyanurate.

The glycidyl compounds can be reacted with aliphatic, cycloaliphatic or aromatic diols to the preferred polyadducts, in which reaction a secondary alcohol is formed at the glycidyl group which can be sulfated and/or sulfonatoalkylated.

The glycidyl compounds can also be reacted with primary aliphatic, cycloaliphatic or aromatic monoamines (e.g. aniline, toluidine, $C_1$–$C_{12}$alkylamines, $C_2$–$C_{12}$hydroxyalkylamines), aliphatic, cycloaliphatic or aromatic dicarboxylic acids (e.g. maleic acid, adipic acid, trimethyladipic acid, sebacic acid, dodecylsuccinic acid, phthalic acid, terephthalic acid, $\Delta_4$-tetrahydrophthalic acid, hexahydrophthalic acid, 4-methylhexahydrophthalic acid, 3,6-endomethylene-$\Delta_4$-tetrahydrophthalic acid, 4-methyl-3,6-endomethylene-$\Delta_4$-tetrahydrophthalic acid), or with aliphatic, cycloaliphatic, heterocyclic or aromatic di-secondary amines or di-secondary carboxamides (e.g. N,N'-dimethylethylenediamine, N,N'-dimethylpropylene-1,3-diamine, N,N'-dimethylhexamethylenediamine, N,N'-dicyclohexylhexamethylenediamine, N,N',N"-trimethyldiethylenetriamine, N,N'-diethylpropylene-1,3-diamine, N-methyl-3,5,5-trimethyl-3-(methylaminomethyl)cyclohexylamine, N,N'-dimethylated or diethylated aromatic diamines, e.g. m- or p-phenylenediamine, bis(4-aminophenyl)methane or bis(4-aminophenyl)sulfone, 2,2-bis(4-aminophenyl)propane, N,N-dimethyl-m-xylylenediamine, as well as ethyleneurea, 5,5-dimethylhydantoin, 5-isopropylhydantoin, N,N-methylenebis-5,5-dimethylhydantoin, 1,3-bis(5,5-dimethyl)-2-hydroxypropane, 5,5-dimethyl-6-isopropyl-5,6-dihydrouracil), by polyaddition to give linear polyadducts.

A preferred novel composition is one wherein the polyadduct contains a) 100 to 5% molar of identical or different structural units of formula II and/or IIa

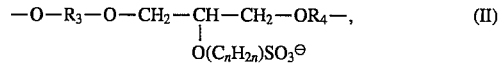

(II)

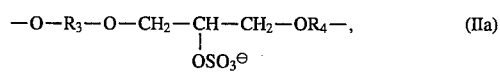

(IIa)

and b) 95 to 0% molar of identical or different structural units of formula III

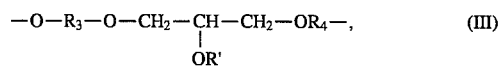

(III)

based on the structural units of the polyadduct, where $R_3$ and $R_4$ are each independently of the other the radical of a diol containing aliphatic or aromatic diol groups and lacking two hydroxyl groups, and R' is H, $C_1$–$C_{20}$alkyl, $C_1$–$C_{20}$acyl or aminocarbonyl which is N-substituted by a $C_1$–$C_{20}$hydrocarbon radical.

R' defined as $C_1$–$C_{20}$alkyl may be linear or branched. R' defined as acyl may be $C_1$–$C_{20}$alkyl—CO—, $C_5$–$C_8$cycloalkyl-CO—, $C_1$–$C_{15}$alkyl-$C_5$–$C_8$cycloalkyl-CO, $C_5C_8$cycloalkyl—$CH_2$—CO—, $C_1$–$C_{14}$alkyl-$C_5$–$C_8$cycloalkyl-$CH_2$—CO, phenyl-CO, benzyl-CO, $C_1$–$C_{14}$alkylphenyl-CO— or $C_1$–$C_{14}$alkylbenzyl-CO—. The hydrocarbon moiety of the aminocarbonyl group may typically be $C_1$–$C_{20}$alkyl, $C_5$–$C_8$cycloalkyl, $C_1$–$C_{15}$alkyl-$C_5$–$C_8$cycloalkyl, $C_5$–$C_8$cycloalkyl-$CH_2$—, $C_1$–$C_{14}$alkyl-$C_5$–$C_8$cycloalkyl-$CH_2$—, phenyl, benzyl, $C_1$–$C_{14}$alkylphenyl or $C_1$–$C_{14}$alkylbenzyl. R' is preferably H, $C_1$–$C_6$acyl or $C_1$–$C_4$alkyl. Most preferably R' is H.

Preferably the polyadduct contains 100 to 20% molar, most preferably 100 to 30% molar, of structural units of formula II and/or IIa, and 0 to 80% molar, most preferably 0 to 70% molar, of structural units of formula III. Most preferably, the polyadduct contains 90 to 60% molar of structural units of formula II and/or IIa and 10 to 40% molar of of structural units of formula III.

In a preferred embodiment of the invention, $R_3$ and $R_4$ are identical radicals. $R_3$ and $R_4$ defined as a radical containing aliphatic diol groups preferably contains 2 to 12, preferably 2 to 8, carbon atoms. The hydroxyl groups may be attached to open chain or cyclic aliphatic radicals. Suitable aliphatic radicals are typically linear or branched $C_2$–$C_{12}$alkylene, $C_3$–$C_8$cycloalkylene, $C_1$–$C_4$alkyl-$C_5$–$C_8$cycloalkylene, cyclohexylmethylene or cyclohexyldimethylene. Typical examples of such alkylene radicals are ethylene, 1,2- or 1,3-propylene, 1,2-, 1,3- or 1,4-butylene, 1,2-, 1,3-, 1,4- or 1,5-pentylene, 1,2-, 1,3-, 1,4-, 1,5 or 1,6-hexylene, heptylene, octylene, nonylene, decylene, undecylene, dodecylene, 1,3-cyclopentylene, 1,3- or 1,4-cyclohexylene, 2-methyl-1,4-cyclohexylene and cyclohexyl-1,4-dimethylene.

The aromatic diol groups of the diols used for the polyadducts are preferably phenolic groups. The diol groups containing phenolic groups preferably contain 6 to 30, most preferably 6 to 20 carbon atoms. In a preferred embodiment of the novel formulation, $R_3$ and $R_4$ are each independently of the other a radical of formula IV

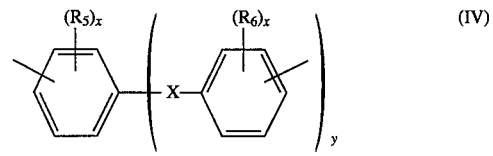

(IV)

wherein X is a direct bond, $C_1$–$C_4$alkylene, $C_2$–$C_{12}$alkylidene, $C_5$–$C_8$cycloalkylidene, —O—, —S—, —SO—, —$SO_2$—, —CO—, —$CO_2$—, —N($C_1$–$C_4$alkyl) or —Si($CH_3$)$_2$, $R_5$ and $R_6$ are each independently of the other H, halogen, $C_1$–$C_4$alkyl or $C_1$–$C_4$alkoxy, and x is 1 or 2 and y is 0 or 1.

X is preferably a directe bond, methylene, ethylene, $C_2$–$C_6$alkylidene, cyclohexylidene or cyclopentylidene, —O— or —S—. $R_5$ and $R_6$ are preferably H or methyl and y is preferably 1.

Preferably $R_3$ and $R_4$ are the radical

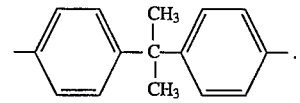

.

Another preferred embodiment of the novel formulation is that wherein the thermoplastic polymer is an at least partially sulfated and/or sulfonatoalkylated polyvinyl alcohol or sulfated and/or sulfonatoalkylated polyvinyl alcohol copolymer containing

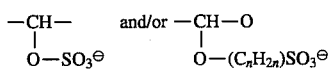

groups. The formulation preferably contains sulfated and/or sulfonatoalkylated polyvinyl alcohol copolymers.

Preferred formulations are those that contain polyvinyl alcohol copolymers wherein the copolymer contains a) 90 to 5% molar of structural units of formula V and/or Va

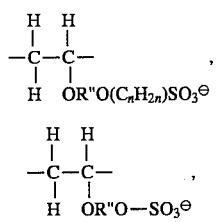

and b) 95 to 10% molar of identical or different structural units of formula VI

wherein $R_7$ is H, $C_1$–$C_6$alkyl, —$COOR_{10}$ or —$COO^\ominus$, $R_8$ is H, F, Cl, CN or or $C_1$–$C_6$alkyl, and $R_9$ is H, OH, —R"OH, F, Cl, CN, $R_{10}$—O—, $C_1$–$C_{12}$alkyl, —$COO^\ominus$, —$COOR_{10}$, —OCO—$R_{10}$, methylphenyl or phenyl, where $R_{10}$ is $C_1$–$C_{18}$alkyl, $C_5$–$C_7$cycloalkyl, ($C_1$–$C_{12}$alkyl)-$C_5$–$C_7$-cycloalkyl, phenyl, ($C_1$–$C_{12}$alkyl)phenyl, benzyl or ($C_1$–$C_{12}$alkyl)benzyl, and R" is linear or branched $C_2$–$C_{18}$alkylene, poly($C_2$–$C_6$oxaalkylene) containing 2 to 6 oxaalkylene units, and the group —($C_nH_{2n}$)— has the meaning previously assigned to it.

The formulations preferably contain 60 to 10% molar, most preferably 60 to 20% molar, of structural units of formula IV, and 40 to 90% molar, preferably 40 to 80% molar, of structural units of formula V.

R" as alkylene preferably contains 2 to 12, most preferably 2 to 8 and, most preferably, 2 to 6 carbon atoms. Typical examples are ethylene and the isomers of propylene, butylene, pentylene, hexylene, heptylene, octylene, nonylene, decylene, undecylene, dodecylene, tetradecylene, hexadecylene and octadecylene. Preferred meanings are ethylene, 1,2- and 1,3-propylene, 1,2-, 1,3- and 1,4-butylene, 1,2-, 1,3-, 1,4- and 1,5-pentylene and 1,2-, 1,3-, 1,4-, 1,5- and 1,6-hexylene.

R" defined as poly(oxaalkylene) preferably contains 2 to 4 oxaalkylene units and, preferably, 2 to 4, most preferably, 2 or 3, carbon atoms in the alkylene moiety.

$R_7$ is preferably H. $R_7$ defined as alkyl is preferably methyl or ethyl. In the group —$COOR_{10}$ represented by $R_7$, $R_{10}$ is preferably $C_1$–$C_{12}$alkyl, most preferably $C_1$–$C_6$alkyl.

$R_8$ defined as alkyl is preferably $C_1$–$C_4$alkyl, typically methyl, ethyl, n-propyl and n-butyl. $R_8$ is preferably H, Cl or $C_1$–$C_4$alkyl.

In the group $R_{10}$—O— represented by $R_9$, $R_{10}$ is preferably $C_1$–$C_{12}$alkyl, most preferably $C_1$–$C_6$alkyl. Alkyl represented by $R_9$ preferably contains 1 to 6, most preferably 1 to 4, carbon atoms. In the group —$COOR_{10}$ represented by $R_9$, $R_{10}$ is preferably $C_1$–$C_{12}$alkyl, most preferably $C_1$–$C_6$alkyl, cyclopentyl or cyclohexyl. In the group —OCO—$R_{10}$ represented by $R_9$, $R_{10}$ is preferably $C_1$–$C_{12}$alkyl, most preferably $C_1$–$C_6$alkyl, phenyl or benzyl dar.

In a preferred embodiment of the novel formulations, $R_7$ is H, $R_8$ is H, F, Cl, methyl or ethyl, and $R_9$ is H, OH, F, Cl, CN, $C_1$–$C_4$alkyl, $C_1$–$C_6$alkoxy, —COO—$C_1$–$C_6$alkyl, —OOC—$C_1$–$C_6$alkyl or phenyl.

Particularly preferred formulations are those containing structural units of formula VI, wherein $R_7$ is H, $R_8$ is H or methyl, and $R_9$ is H, OH, CN, methyl, $OCH_3$ or —$COOCH_3$.

Very particularly preferred formulations are those that contain 20 to 60% molar of structural units of formula V, 50 to 40% molar of structural units of formula —$CH_2$—$CH_2$— and 0 to 40% molar of structural units of formula —$CH_2$—CH(OH)—, the sum of the molar percentages being 100 per cent.

A further preferred embodiment of the novel formulations is that wherein the thermoplastic polymer is a sulfated and/or sulfonatoalkylated polymer of a partially hydroxylated polybutadiene, chloroprene or polyisoprene.

A preferred embodiment of the novel formulations is a formulation that contains 5 to 100% molar of structural units of formulae VII and/or VIIa

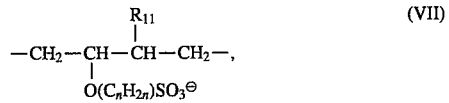

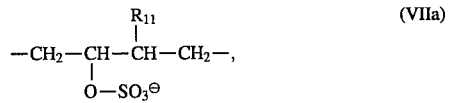

and 0 to 95% molar of structural units of formulae VIII and/or VIIIa,

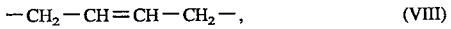

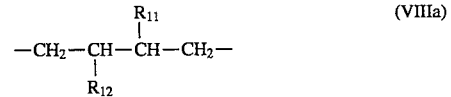

wherein $R_{11}$ and $R_{12}$ are each independently of the other H, OH or Cl, and the group —$C_nH_{2n}$— has the meaning previously assigned to it, including the preferred meanings.

This formulation preferably contains 10 to 100% molar, most preferably 20 to 60% molar, of structural units of formulae of structural units of formulae VII and/or VIIa and 90 to 0% molar, most preferably 80 to 40% molar, of structural units of formulae VIII and/or VIIIa. $R_{11}$ is preferably H or Cl, and $R_{12}$ is preferably H.

A further preferred emodiment of the novel formulations is that wherein the thermoplastic polymer is a sulfated and/or alkylsulfonatated polyimide containing structural units of formula IX

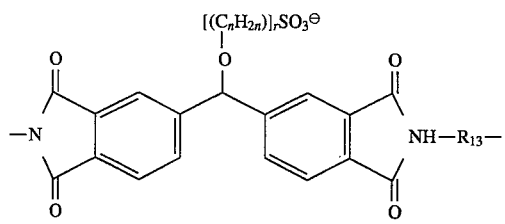 (IX)

wherein $R_{13}$ is substituted or $C_1$–$C_6$alkyl- or $C_1$–$C_6$alkoxy-substituted $C_6$–$C_{C12}$arylene or $C_5$–$C_8$cycloalkylene or is the radical

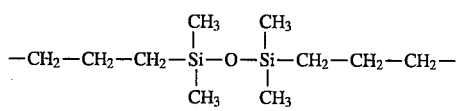

r is 0 or 1, and the group —$C_nH_{2n}$— has the meaning previously assigned to it, including the preferred meanings.

Yet another preferred embodiment of the novel formulations is that wherein the thermoplastic polymer is a sulfated and/or sulfonatoalkylated polyamide containing structural units of formula X

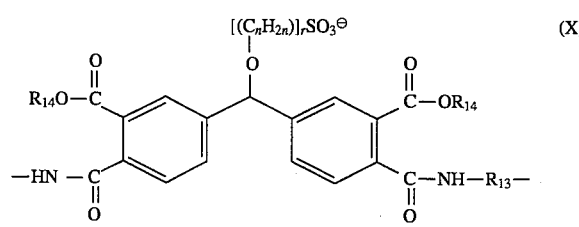 (X)

wherein $R_{13}$ is unsubstituted or $C_1$–$C_6$alkyl- or $C_1$–$C_6$alkoxy-substituted $C_6$–$C_{12}$arylene or $C_5$–$C_8$cycloalkylene or is the radical

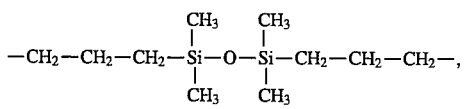

$R_{14}$ is $C_1$–$C_{12}$alkyl, r is 0 or 1 and the group —$C_nH_{2n}$— has the meaning previously assigned to it, including the preferred meanings.

A very particularly preferred novel formulation is that wherein the film-forming thermoplastic polymer contains a) 100 to 50% molar of identical or different structural units of formula II and/or IIa

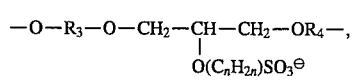 (II)

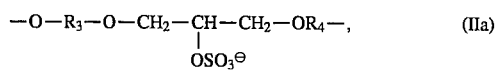 (IIa)

and b) 0 to 50% molar of identical or different structural units of formula III

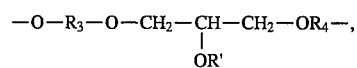 (III)

based on the structural units of the polyadducts, wherein $R_3$ and $R_4$ are each independently of the other the radical of a diol lacking two hydroxyl groups and containing aliphatic or aromatic diol groups, and R' is H, $C_1$–$C_{20}$alkyl, $C_1$–$C_{20}$acyl or aminocarbonyl which is N-substituted by a $C_1$–$C_{20}$hydrocarbon radical. Preferably the polymer contains 60 to 100% molar, most preferably 60 to 90% molar, of structural units of formulae II and/or IIa, and 40 to 0% molar, most preferably 40 to 10% molar, of structural units of formula III. R' is preferably H. This formulation most preferably contains a polythiophene in oxidised polycationic form and structural repeating units of formula I

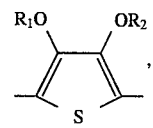 (I)

wherein $R_1$ and $R_2$ are each independently of the other linear or branched $C_1$–$C_6$alkyl or $R_1$ and $R_2$, taken together, are methylene or the radical —$CHR_a$—$CHR_b$—, wherein $R_a$ and $R_b$ are each independently of the other H, methyl or ethyl and, most preferably, H.

A preferred embodiment of these formulations is that wherein $R_3$ and $R_4$ are each independently of the other a radical of formula IV

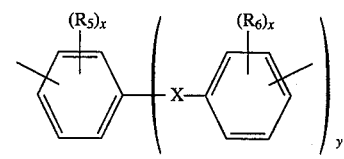 (IV)

wherein X is a direct bond, $C_1$–$C_4$alkylene, $C_2$–$C_{12}$alkylidene, $C_5$–$C_8$cycloalkylidene, —O—, —S—, —SO—, —SO$_2$—, —CO—, —CO$_2$—, —N($C_1$–$C_4$alkyl) or —Si(CH$_3$)$_2$, $R_5$ and $R_6$ are each independently of the other H, halogen, $C_1$–$C_4$alkyl or $C_1$–$C_4$alkoxy, and x is 1 or 2, and y is 0 or 1.

X is preferably a direct bond, methylene, ethylene, $C_2$–$C_6$alkylidene, cyclohexylidene or cyclopentylidene, —O— or —S—. $R_5$ and $R_6$ are preferably H or methyl and y is preferably 1.

Preferably $R_3$ and $R_4$ are the radical

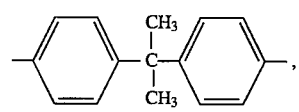

and, most preferably, the structural units of the polythiophene correspond to radicals of formula

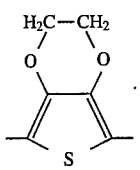

If the formulation contains more than one polyanion of a thermoplastic polymer containing sulfated and/or sulfonatoalkylated alcohol groups, then binary or ternary mixtures are preferred.

The polyanions of component b) in the novel formulation are derived from polymeric salts which are known or obtainable by per se known methods. They are thermoplastic polymers containing sulfated alcohol groups

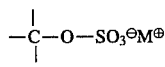

and/or sulfonatoalkylated alcohol groups

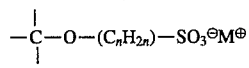

in structural repeating units, where $M^\oplus$ is an alkali metal cation or an ammonium cation.

The ammonium cation may be $NH_4^\oplus$, a protonated primary, secondary or tertiary amine, or quaternary ammonium or pyridinium. The primary ammonium may contain 1 to 18, 1 to 12, and, most preferably, 1 to 6, carbon atoms, the secondary ammonium 2 to 24, preferably 2 to 12 and, most preferably, 2 to 8, carbon atoms, the tertiary ammonium 3 to 30, preferably 3 to 18 and, most preferably, 3 to 12, carbon atoms, and the quaternary ammonium 4 to 36, preferably 4 to 24 and, most preferably, 4 to 18, carbon atoms.

Prefered polymeric salts are those wherein $M^\oplus$ is $Li^\oplus$, $Na^\oplus$ or $K^\oplus$, or is $R_{15}R_{16}R_{17}R_{18}N^\oplus$, wherein $R_{15}$, $R_{16}$, $R_{17}$ and $R_{18}$ are each independently of one another H, unsubstituted or hydroxyl-substituted $C_1$–$C_{18}$alkyl, phenyl, ($C_1$–$C_{12}$alkyl)phenyl, ($C_1$–$C_{12}$alkyl)benzyl, $C_5$–$C_7$cycloalkyl, ($C_1$–$C_{12}$alkyl)-$C_5$–$C_7$-cycloalkyl, or $R_{15}$ and $R_{16}$, taken together, are tetramethylene, pentamethylene or 3-oxapentylene, and R17 and $R_{18}$ have the meanings previously assigned to them. A preferred embodiment of the polymers is that wherein at least one of $R_{15}$ to $R_{18}$ is not H. Especially preferred polymers are those wherein $R_{15}$ to $R_{17}$ are $C_1$–$C_6$alkyl and $R_{18}$ is H.

$R_{15}$ to $R_{18}$ defined as alkyl may be linear or branched and contain preferably 1 to 12, most preferably 1 to 6, carbon atoms. Typical examples of such alkyl groups are methyl, ethyl, n- and isopropyl, n-, iso- and tert-butyl, pentyl, hexyl, heptyl, octyl, nonyl, decyl, undecyl, dodecyl, tetradecyl, hexadecyl and octadecyl.

$R_{15}$ to $R_{18}$ defined as hydroxyalkyl may be linear or branched and preferably contain 2 to 18, more particularly 2 to 12 and, most preferably, 2 to 6, carbon atoms. Typical examples are 1-hydroxyeth-2-yl, 1-or 2-hydroxy-prop-3-yl, 1-hydroxybut-4-yl, 1-hydroxyhex-6-yl.

Typical examples of alkylphenyl and alkylbenzyl are methylphenyl, dimethylphenyl, ethylphenyl, n- or isopropylphenyl, n-, iso- or tert-butylphenyl, hexylphenyl, octylphenyl, decylphenyl, dodecylphenyl and corresponding alkylated benzyl radials.

$R_{15}$ to $R_{18}$ defined as cycloalkyl are preferably cyclopentyl or cyclohexyl.

$R_{15}$ to $R_{18}$ defined as alkylcycloalkyl is preferably ($C_1$–$C_{12}$alkyl)cyclopentyl or ($C_1$–$C_{12}$alkyl)cyclohexyl, typically methylcyclopentyl or ethylcyclopentyl or methyl- or ethylcyclohexyl.

Most preferably, $R_{15}$ to $R_{18}$ are $C_1$–$C_6$alkyl, or $R_{15}$ to $R_{17}$ are $C_1$–$C_6$alkyl and $R_{18}$ is H.

The polymeric salts eligible for use in the practice of this invention are known or can be prepared by known standard methods. Depending on the type of polymer used and on the process conditions, the hydroxyl groups of the monomers can be protected by customary protective groups. Hydroxylated polymers are widely described in the literature or can be obtained by known methods.

The eligible thermoplastic polymeric salts can be obtained in known manner by reacting a thermoplastic polymer which contains alcohol groups

in structural repeating units with a sulfating agent (e.g. pyridine. $SO_3$) or a sultone of formula

in the presence of an inert solvent and an alkali metal base or an amine, and afterwards isolating the polymeric salt. The reaction can be carried out stepwise initially with a less than equivalent amount of a sulfating agent or with a sultone and then with a sultone or sulfating agent to give a polymer containing sulfato groups and sulfonatoalkyl groups.

Suitable inert solvents are preferably polar aprotic solvents, the choice of solvent depending mainly on the solubility of the hydroxyl group containing polymer. The solvents may be used singly or in mixtures of at least two solvents. Typical examples are: ethers such as dibutyl ether, tetrahydrofuran, dioxane, methylene glycol, dimethyl ethylene glycol, dimethyl diethylene glycol, diethyl diethylene glycol, dimethyl triethylene glycol, halogenated hydrocarbons, including methylene chloride, chloroform, 1,2-dichloroethane, 1,1,1-trichloroethane, 1,1,2,2-tetrachloroethane, carboxamides and lactams such as N,N-dimethylformamide, N,N-diethylformamide, N,N-dimethylacetamide, N,N-diethylacetamide, N-methyl-γ-butyrolactam, N-methyl-ε-caprolactam, N-methylpyrrolidone, N-acetylpyrrolidone, tetramethylurea, hexamethylphosphoric triamide, sulfoxides, including dimethyl sulfoxide, sulfones such as dimethyl sulfone, diethyl sulfone, trimethylene sulfone, tetramethylene sulfone, N-methylpyrrolidine, N-methylpiperidine, N-methylmorpholine, substituted benzenes such as benzonitrile, chlorobenzene, o-dichlorobenzene, 1,2,4-trichlorobenzene, nitrobenzene.

The reaction temperature is typically in the range from 40° to 200° C., preferably from 60° to 150° C. Upon termination of the reaction, the polymeric salt can be precipitated with a non-solvent, conveniently water, isolated, washed and dried.

Sulfonatoalkylated phenoxy resins are disclosed, inter alia, in BE-B-847 353. Sulfonatoalkylated polyvinyl alcohols are disclosed, inter alia, EP-A-0 099 631 and in FR-B-1 584 814. Sulfated polymers are disclosed, inter alia, in U.S. Pat. No. 5,061,401.

The eligible polymeric salts of sulfated and/or sulfonatoalkylated hydroxylated polymers have thermoplastic properties. Their glass transition temperature is, compared with the starting polymers, substantially unchanged and they are distinguished by their mechanical strength, including superior tensile and flexural strength and superior flexibility. Surprisingly, they are especially suitable for use as polyanions for electrically conductive polycations of alkoxy-substituted polythiophenes.

The novel formulations are prepared in per se known manner by a) electropolymerising, in an aqueous organic or aqueous solution, a thiophene of formula I, in the presence of at least one salt of a film-forming thermoplastic polymer containing sulfated alcohol groups

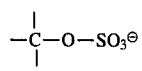

and/or sulfonatoalkylated alcohol groups

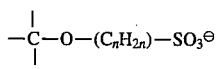

in structural repeating units, wherein the group $-(C_nH_{2n})-$ is linear or branched $C_2-C_{12}$ alkylene which contains 2 to 5 carbon atoms in the carbon chain and is unsubstituted or substituted by $C_1-C_4$alkoxy, and thereafter removing the composition from the anode, or b) reacting a thiophene of formula I, in the presence of said salt and an inert solvent, with an oxidising agent.

Depending on the reaction conditions, the formulation can be obtained as a powder or film. Process b) is conveniently used for the preparation of a powder formulation and process a) conveniently for the preparation of a material in film form.

Suitable oxidising agents are typically peroxides and persulfates, preferably $H_2O_2$, $K_2S_2O_8$ and $(NH_4)_2S_2O_8$ as well as iron(III) compounds and copper(II) compounds, preferably $FeCl_3$ and $CuCl_2$.

The electrolysis can be carried out potentiostatically or galvanostatically. Suitable anode materials include inert metals (titanium, nickel, platinum, steel) or ITO glass, or inert metals such as aluminium (q.v. DE-A-3 906 563). The current density may be from 0.05 to 50, preferably from 0.05 to 20 and, most preferably, 0.05 to 10, $mA/cm^2$. A suitable anode material also consists of brush electrodes. It has been found very useful to to control the oxidation potential during electrolysis by connecting the anode to a reference electrode, as it is thereby often possible to promote the desired electrical conductivity of the novel compositions. The voltage of the reference electrode is conveniently in the range from 1.1 to 2 volts, preferably from 1.3 to 1.6 volts.

The concentration of polymeric salts can be from 0.05 to 1 mol/l, preferably 0.05 to 0.5 mol/l, based on the reaction mixture. The concentration of thiophenes of formula I may be 0.01 to 10% by volume, preferably 0.1 to 5% by volume, based on the volume of the reaction mixture.

Suitable organic solvents have already been mentioned. Preferred solvents are alcohols, including alkanols of 1 to 12 carbon atoms which may be substituted by $C_1-C_4$alkoxy. Typical examples of such solvents are methanol, ethanol, n- and isopropanol, n-, iso- and tert-butanol, pentanol, hexanol, heptanol, octanol, decanol, dodecanol, methoxyethanol, ethoxyethanol, diethylene glycol monomethyl or monoethyl ether, 1-methoxypropan-2- or-3-ol. Further preferred solvents are carboxylates such as propylene carbonate, which is preferably used for the electrochemical polymerisation.

The formation of films or powder deposits on the electrode can be determined by the conditions of electrolysis and especially by the choice of solvent. The presence of polar protic solvents alone or in admixture with polar solvents is able to promote the formation of powders.

Given sufficient solubility of the reactants, the electrochemical polymerisation can also be carried out in water or aqueous organic solution. The concurrent use of buffers is useful. Suitable buffers are conveniently alkylammonium phosphates containing 1 to 3, preferably 2 or 3, alkyl radicals in the ammonium group, which can contain 11 to 6, preferably 1 to 4, carbon atoms. Exemplary of suitable buffers are trimethyl-, triethyl-, tri-n-propyl- and tri-n-butylammonium phosphate. Suitable buffers are also cation exchangers in their protonated form.

The reaction mixture may also contain further substances which deposit simultaneously on the anode, typically anionic plasticisers or anionic dyes.

Upon termination of the electrolysis, the novel compositions can be peeled from the anode in the form of films and purified by washing with water. The films may have a thickness of 0.1 µm to 0.3 cm, preferably from 0.5 µm to 0.1 cm, more particularly 0.5 µm to 500 µm and, most preferably, from 1 µm to 50 µm. The thickness will depend essentially on the duration of the electrolysis.

The oxidation with iron(III) compounds can be carded out typically in the temperature range from –20° to 150° C., preferably from 20° to 100° C. Suitable solvents have been mentioned previously in connection with the preparation of the polymeric salts. Provided the iron(III) compounds, for example iron salts, are insoluble in organic solvents, it is convenient to use water-soluble solvents in admixture with water. Suitable water-soluble solvents are preferably $C_1-C_{12}$alkanols, preferably $C_1-C_4$alkanols, which may be substituted by $C_1-C_4$alkoxy. Examples of alkanols have been mentioned previously.

Suitable iron(III) compounds are typically iron(III) complexes or complex salts or, preferably, iron(III) salts of inorganic and organic acids such as HCl, HBr, HI, $H_2SO_4$, $HClO_4$, $HNO_3$, $FSO_3H$, $CF_3SO_3H$, acetic acid and propionic acid. Iron(III) halides, especially iron(III) chloride, are preferred. In addition to Fe(III) salts, it is also possible to use other oxidising agents such as ammonium peroxodisulfate and Cu(II) salts.

In the chemical oxidation it is convenient to use sodium or potassium salts of sulfated and/or sulfonatoalkylated thermoplastic polymers which preferably contains 80 to 100% molar of structural units containing sulfated and/or sulfonatoalkylated hydroxyl groups.

The chemical oxidation method is described, inter alia, in Bull. Chem. Soc. Jpn. 62, pp. 234–238 (1989. The reaction proceeds rapidly and the desired products are obtained as black powders or resins which are filtered and washed with water, NaOH or both. In the chemical oxidation the novel compositions may contain anions of oxidising agents. If ionic chloride is present, it can be removed by treating the powder with chlorosulfonic acid and subsequent washing with water. The granular size of the powder particles is typically from 1 µm to 10 µm.

The novel formulations are black, free-flowing and electrically conductive powders or films with glass transition temperatures of up to c. 200° C. and higher and having thermoplastic properties and from which moulded articles of any three-dimensional shape can be produced by known moulding methods, including injection moulding under pressure. The films can also be processed by stretching techniques, typically deep drawing. The mechanical properties of films made from the novel compositions can be still further improved by stretching in the range of the glass transition temperatures. A further object of the invention is the use of the novel compositions for the production of electrically conductive moulded articles, including rods, boards, casings and other moulded parts which are useful for screening electromagnetic fields, or as electrodes.

The novel compositions can be used in the form of powders as moulding materials. The moulding materials can be processed at low temperature to sintered articles which may be porous. When applying high pressure and elevated temperature, conveniently below the decomposition temperatures to the range of the glass transition temperatures, preferably from 60° to 150° C., the moulding materials are surprisingly free-flowing. Under such processing conditions, compact moulded articles with smooth surfaces and good mechanical properties are obtained, including flexural strength, ultimate strength, tensile strength, flexibility and toughness.

The moulded articles made from the novel compositions have superior electrical conductivities which are normally above 0.1 S/cm. The conductivity can be promoted by subjecting the moulded articles to an afterbake or by the pressure and/or temperature applied in shaping techniques or by stretching films. Surprisingly, stretching can even be carried out in the room temperature range. When stretching films in the range from room temperature to glass transition temperature, the electrical conductivity is surprisingly increased. The novel compositions additionally have useful mechanical properties.

The moulded articles and films made from the novel compositions may be used, inter alia, as electrical conductors, electrodes, cathodes for batteries, electromagnetic screening materials, electrically conductive rods, sensors, antistatic packing material, electrically conductive sealing material, charge carriers for capacitors, electrochromic materials or IR absorbers.

The powder formulations can also be incorporated into polymers as electrically conductive fillers, typically in amounts of 0.1 to 90% by weight, preferably of 5 to 80% by weight, based on the polymer. Those skilled in the art will be familiar with suitable polymers, including the thermosetting and thermoplastic resins and structurally crosslinked polymers, as well as with incorporation techniques and the use of processing assistants, other fillers, colorants and stabilisers. Depending on the amount of electrically conductive filler, moulded articles made from these filler-loaded polymers can be used as electrical conductors or as components for screening electric and magnetic fields. A further object of the invention is the use of the novel powder formulations as fillers for natural and synthetic polymers.

The invention further relates to a formulation comprising a) a thermoplastic or thermosetting resin or a structurally crosslinked polymer into which is incorporated b) an electrically conductive, finely particulate filler obtained from a novel powder formulation.

The amount of component b) can be 0.1 to 90% by weight, preferably of 5 to 80% by weight, based on component a). An amount of up to c. 20% by weight gives electrical conductivities which are suitable for providing an antistatic finish and for screening electrical fields. High electrical conductivities and moulded articles suitable, inter alia, for use as electrical conductors, are obtained with amounts of more than 20% by weight, preferably of at least 30% by weight.

Typical examples of suitable polymers are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers, LDPE/ethylene-acrylic acid copolymers, LLDPE/ethylene-vinyl acetate copolymers, and LLDPE/ethylene-acrylic acid copolymers.

3a. Hydrocarbon resins (for example $C_5$–$C_9$) including hydrogenated modifications thereof (e.g. tackifiers).

4. Polystyrene, poly(p-methylstyrene), poly(α-methylstyrene).

5. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

7. Halogen-containing polymers such as polychloroprene, chlorinated rubbers, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

8. Polymers derived from $\alpha,\beta$-unsaturated acids and derivatives thereof such as polyacrylates and polymethacrylates; polymethyl methacrylates, polyacrylamides and polyacrylonitriles.

9. Copolymers of the monomers mentioned under 8) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

10. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

11. Homopolymers and copolymers of cyclic ethers such as polyalkylene glycols, polyethylene oxide, polypropylene oxide or copolymers thereof with bisglycidyl ethers.

12. Polyacetals such as polyoxymethylene and those polyoxymethylenes which contain ethylene oxide as a comonomer, polyacetals modified with thermoplastic polyurethanes, acrylates or MBS.

13. Polyphenylene oxides and sulfides, and mixtures of polyphenylene oxides with styrene polymers or polyamides.

14. Polyurethanes derived from hydroxyl-terminated polyethers, polyesters or polybutadienes on the one hand and aliphatic or aromatic polyisocyanates on the other, as well as precursors thereof.

15. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

16. Polyureas, polyimides, polyamide-imides and polybenzimidazoles.

17. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

18. Polycarbonates and polyester carbonates.

19. Polysulfones, polyether sulfones and polyether ketones.

20. Crosslinked polymers derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins derived from copolyesters of saturated and unsaturated dicarboxylic acids with polyhydric alcohols and vinyl compounds as crosslinking agents, and also halogen-containing modifications thereof of low flammability.

23. Crosslinkable acrylic resins derived from substituted acrylates, for example epoxy acrylates, urethane acrylates or polyester acrylates.

24. Alkyd resins, polyester resins and acrylate resins crosslinked with melamine resins, urea resins, polyisocyanates or epoxy resins.

25. Crosslinked epoxy resins derived from polyepoxides, for example from bisglycidyl ethers or from cycloaliphatic diepoxides.

26. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

27. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

Further additives for enhancing the processing properties, the mechanical, electrical and thermal properties, surface properties and light stability can be blended into the novel formulation. Exemplary of such additives are finely particulate fillers, fillers, reinforcing fillers, plasticisers, lubricants and mould release agents, adhesion promoters, antioxidants, heat and light stabilisers, pigments and dyes.

The novel formulation can be be prepared by methods known in plastics technology, conveniently by blending the finely particulate thermally conductive filler with the polymer before or after its synthesis, by plasticising the polymer and blending it with the filler by calendering, kneading, extrusion or injection moulding to prepare granulates or mouldings. It is also possible to make a dry blend of the powdered polymer with the filler and then to mould the formulation, or to suspend the filler in a solution of the polymer, then to remove the solvent and subsequently to process the formulation.

When using thermoset resins and structurally crosslinked polymers, the finely particulate filler is conveniently added prior to shaping and to curing or crosslinking, typically by blending the resin components jointly with the filler, which may be incorporated beforehand in one component.

The novel formulation is a useful moulding material for the fabrication of all kinds of thermally conductive moulded articles, including films, foils, ribbons, fibres, boards, semi-finished products, shaped articles and casings. The conventional techniques of plastics processing can be used, typically calendering, injection moulding, compression moulding, extruding, deep drawing and sintering.

The finely particulate, electrically conductive filler is thermoformable, especially when processed under pressure and elevated temperature. Such processing techniques are therefore preferred, as normally a greater electrical conductivity can thereby be achieved. The compatibility with the basic polymers can be influenced by the choice of sulfated and/or sulfonatoalkylated polyanion. Polyanions carrying functional groups, typically hydroxyl groups, can lead to crosslinks with corresponding basic polymers (e.g. epoxy resins). The mouldings have good mechanical properties and long-lasting electrical conductivities, which are normally at least 0.01 S/cm. The conductivity can be increased by subjecting the mouldings to an afterbake.

A further object of the invention is the use of this novel formulation for fabricating electrically conductive mouldings.

The following Examples illustrate the invention in more detail. The conductivity is measured by the 4-point method. The tensile strength is determined in accordance with DIN 53 455 and the glass transition temperature ($T_g$) by differential scanning calorimetry. The sulfated thermoplastic polymers are prepared by the methods described in U.S. Pat. No. 5,061,401.

EXAMPLE 1

Galvanostatically controlled polymerisation 2 g (3.6 mmol) of the tri-n-butylammonium salt of a poly(β-hydroxy ether) which is partially sulfated to a degree of 30% molar (prepared by polyaddition of the diglycidyl ether of bisphenol A and bisphenol A) and which has an average molecular weight of 28 000 Dalton, and 0.2 ml (0.75% by volume) of 3,4-ethylenedioxythiophene (EDT) are dissolved in at room temperature in 30 ml of propylene carbonate, and the solution is transferred to a an electrolysis cell filled with inert gas. This cell is fitted with fine steel electrodes (area 5 cm$^2$). A rotating anode is used to ensure homogeneous mixing of the electrolyte solution. The cathode is used in net form to ensure the removal of gaseous by-products. An Ag/AgCl reference electrode is connected to the anode for controlling the oxidation potential of the electropolymerisation. The deposited films are peeled mechanically from the anode, extracted in acetonitrile for 1 h under reflux and dried at 50° C. under a high vacuum. The reaction conditions and the electrical conductivities at different current densities, electrode potentials ($E_{pot}$W/CE), reference potentials ($E_{pot}$W/Ref) and electrolysis times are summarised in Table 1:

TABLE 1

| Current density (mA/cm$^2$) | $E_{pot}$W/CE (V) | $E_{pot}$W/Ref (V) | t (h) | σ(S/cm) |
|---|---|---|---|---|
| 0.1 | 3.1 | 1.5–1.6 | 2.5 | 70 |
| 0.2 | 3.14 | 1.2 | 1.5 | 27 |
| 0.06 | 2.85 | 1.01 | 16 | 6 |

EXAMPLE 2

0.05 mol/l of a sulfated phenoxy resin (degree of sulfation 25% molar) and 6.8 g (5 ml) of 3,4-propylidenedioxythiophene are dissolved in 200 ml of propylene carbonate and 2 ml of water and the solution is transferred to an electrolysis cell filled with inert gas and fitted with fine steel electrodes. After passage of a charge of 3.6 C/cm$^2$ through the cell, a 70 μm film is deposited on the anode. This film is purified and dried as described in Example 1. The conductivity of the film is 104 S/cm.

EXAMPLE 3

A solution of 6 g (0.05 mol/l) of a sulfated phenoxy resin (degree of sulfation 25% molar) and 0.48 mol/l of 3,4-ethylenedioxythiophene (EDT) in 100 ml of propylene carbonate and 1 ml of water is transferred to an electrolysis cell filled with inert gas and fitted with fine steel electrodes. After passage of a charge of 7.2 C/cm$^2$ through the cell, a 110 μm film is deposited on the anode. This film is purified and dried as described in Example 1. The conductivity of the film is 200 S/cm.

EXAMPLE 4

The procedure of Example 3 is repeated, but using γ-butyrolactone as solvent. The conductivity of the film is 280 S/cm.

EXAMPLE 5

A solution of 0.05 mol/l of a sulfated phenoxy resin consisting of structural units of 2,2-bis(4-hydroxyphenyl)hexafluoropropane (degree of sulfation 23% molar) and 6 g of 3,4-ethylenedioxythiophene (EDT) in 100 ml of propylene carbonate and 1 ml of water is transferred to an electrolysis cell filled with inert gas and fitted with fine steel electrodes. After passage of a charge of 7.2 C/cm$^2$ through the cell, a 110 μm film is deposited on the anode. This film is purified and dried as described in Example 1. The conductivity of the film is 350 S/cm.

EXAMPLE 6

Potentiostatically controlled polymerisation 0.35 g of the tri-n-butylammonium salt of a poly(β-hydroxy ether) which is partially sulfated to a degree of 30% molar (prepared by polyaddition of the diglycidyl ether of bisphenol A and bisphenol A) and has an average molecular weight of 28 000 Dalton, and 0.2 ml (0.75% by volume) of 3,4-ethylenedioxythiophene (EDT) are dissolved at room temperature in 30 ml of propylene carbonate. The reaction mixture is transferred under inert gas to an electrolysis cell as described in Example 1. The anodic polymerisation of the EDT is controlled under potentiostatic reaction control by applying a potential of 1.5 V to an Ag/AgCl reference electrode for the rotating anode. The current density is 1.2 mA/cm$^2$, the maximum voltage between the working electrode and counter-electrode is 9 V. After t=35 min, a 36 μm film is deposited. The film is purified and dried as described in Example 1. The conductivity of the film is 115 S/cm.

EXAMPLE 7

Potentiostatically controlled polymerisation 0.35 g of the tri-n-butylammonium salt of a hydroxylated cis-polybutadiene which has a degree of hydroxylation of 33% molar and is then partially sulfated ($M_w$300 000, prepared in accordance with Example A7 of U.S. Pat. No. 5,061,401) and 0.2 ml (0.75% by volume)) of EDT are dissolved at room temperature in 30 ml of propylene carbonate. A film is then prepared in accordance with Example 2 under the following conditions: $E_{pot}$(W/ref)=1.5 V, current density 1.6 mA/cm$^2$, $E_{pot}$(W/CE)=7 V, t=50 min. The 57 μm film has a conductivity of 130 S/cm.

EXAMPLE 8

Potentiostatically controlled polymerisation 0.35 g of the tri-n-butylammonium salt of a polyvinyl alcohol which is partially sulfated to a degree of 77% molar and 0.2 ml (0.75% by volume)) of EDT are dissolved at room temperature in 30 ml of propylene carbonate, and the solution is electrolysed as described in Example 2: $E_{pot}(W/ref)=1.5$ V, current density 2 mA/cm², $E_{pot}(W/CE)=8.5$ V, t=40 min. The 30 μm film has a conductivity of 60 S/cm.

EXAMPLE 9

A solution of the tri-n-butylammonium salt of a copolymer of p-vinylphenol and styrene (1:0.79, average molecular weight 3600) which is partially sulfated to a degree of 88% molar and 10 ml of 3,4-ethylenedioxythiophene in 180 ml of polypropylene carbonate and 2 ml of water is flushed with argon and then transferred to an electrolysis cell. At a current density of 2.0 mA/cm², a c. 140 μm film is deposited on the anode. The film is removed mechanically, washed with ethanol and then dried at 50° C. under vacuum. The black film has a conductivity of 51.4 S/cm, a tensile strength of 68 MPa, an elongation of break of 12% at room temperature and 128% at 100° C.

EXAMPLE 10

Mechanical and thermoplastic properties

The mechanical stretchability of some films prepared according to Example 2 from EDT and partially sulfated poly(β-hydroxy ether) obtained from the diglycidyl ether of bisphenol A and bisphenol A) and having an average molecular weight of 28 000 contingent on the degree of sulfation φ (=n/n+m) of the poly(β-hydroxy) ether is determined with a miniature material tester (supplied by Polymer Laboratories). The modulus of elasticity of the films varies as a function of the degree of sulfation φ from 0.3 to 0.9 GPa. The conductivities of the stretched films are measured in the direction of stretching by the 4-point method. The results are summarised in Table 2:

TABLE 2

Stretching ($\Delta l/l_o$) of films at room temperature and 100° C., contingent on the degree of sulfation φ of the polyanion

| φ (n/n + m) | $\sigma^0$ (S/cm) | $\Delta l/l_o$ at RT in (%) | $\sigma^1$ (S/cm) | $\Delta l/l_o$ at 100° C. in (%) | $\sigma^2$ (S/cm) |
|---|---|---|---|---|---|
| 1 | 100 | 14,5 | 135 | 11 | 126 |
| 0.81 | 115 | 27 | 145 | 41 | 137 |
| 0.72 | 97 | 39 | 120 | 99 | 225 |
| 0.63 | 57 | 55 | 145 | 88 | 212 |
| 0.305 | 36 | 60 | 67 | 85 | 72 |
| 0.235 | 30 | 120 | 30 | 100 | 62 |

$\sigma^0$ conductivity of the unstretched film
$\sigma^1$ conductivity of the stretched film at room temperature
$\sigma^2$ conductivity of the film stretched at 100° C.

EXAMPLE 11

Chemical polymerisation of EDT 1 g (2.6 mmol) of the sodium salt of a poly(β-hydroxy ether) obtained from the diglycidyl ether of bisphenol A and bisphenol A), sulfated to a degree of 100% molar and having an average molecular weight of 28 000 Dalton, is dissolved in 30 ml of solvent. After addition of 1.14 g (8.07 mmol) of EDT, 3.06 g of FeCl₃ in 5 ml of H₂O are added dropwise at 100° C. (Example H in Table 3). After a short time the solution turns black. The precipitated powder is isolated by filtration, washed repeatedly with water and dried under vacuum. Further particulars will be found in Table 3. The pressed pellet conductivity is measured by the 4-point method. The formulations of Examples A to G in Table 3 are obtained in substantially similar manner.

TABLE 3

Chemical polymerisation of EDT

| | Oxidising agent | Solvent | T (°C.) | t | Morphology | σ(S/cm) |
|---|---|---|---|---|---|---|
| A | $(NH_4)_2S_2O_8$ | methoxyethnol/H₂O (1:1) | 10 | 3d | powder | 0.11 |
| B | " | benzonitrile | 150 | 5h | " | 0.01 |
| C | " | as A | 100 | 5h | plastic material | 8 · 10⁻⁸ |
| D | FeCl₃ | methoxyethanol | 10 | 1d | powder | 2 · 10⁻⁹ |
| E | " | methoxyethanol | 10 | 3d | " | 3 · 10⁻⁶ |
| F | " | as A | 10 | 2d | powder | 3 · 10⁻⁴ |
| G | " | as A | 100 | 5h | plastic material | 0.13 |
| H | " | methoxyethanol/ H₂O (1:6) | " | " | powder | 1.82 |

What is claimed is:

1. A formulation comprising a) at least one polythiophene in oxidised polycationic form and containing structural repeating units of formula I

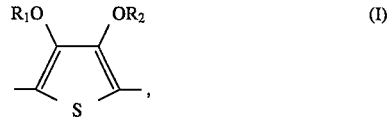

$R_1$ and $R_2$, taken together, are linear $C_1$–$C_6$alkylene which is unsubstituted or substituted by $C_1$–$C_6$alkyl, $C_1$–$C_6$alkoxy, halogen, $C_3$–$C_8$cycloalkyl, phenyl, benzyl, $C_1$–$C_4$alkylphenyl, $C_1$–$C_4$alkoxyphenyl, halophenyl, $C_1$–$C_4$alkylbenzyl, $C_1$–$C_4$alkoxybenzyl or halobenzyl; and b) at least one polyanion of a film-forming thermoplastic polymer containing sulfated alcohol groups

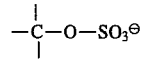

and/or sulfonatoalkylated alcohol groups

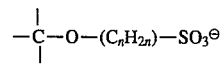

in structural repeating units, wherein the group —$(C_nH_{2n})$— is linear or branched $C_2$–$C_{12}$alkylene which contains 2 to 5 carbon atoms in the carbon chain and is unsubstituted or substituted by $C_1$–$C_4$alkoxy.

2. A formulation according to claim 1, wherein $R_1$ and $R_2$ together as alkylene are $C_1$–$C_4$alkylene.

3. A formulation according to claim 2, wherein $R_1$ and $R_2$ are $C_1$–$C_2$alkylene.

4. A formulation according to claim 2, wherein $R_1$ and $R_2$ as alkylene are methylene, ethylene, propylene, butylene, pentylene and hexylene.

5. A formulation according to claim 1, wherein substituents of $R_1$ and $R_2$ as alkylene are $C_1$–$C_6$alkyl, $C_1$–$C_6$alkoxy, cyclohexyl, phenyl and benzyl.

6. A formulation according to claim 1, $R_1$ and $R_2$ together are $C_1$–$C_4$alkylene which is unsubstituted or substituted by 1 or 2 $C_1$–$C_6$alkyl groups or $C_1$–$C_6$alkoxy groups.

7. A formulation according to claim 6, $R_1$ and $R_2$, taken together, are $C_1$–$C_2$alkylene.

8. A formulation according to claim 7, wherein $R_1$ and $R_2$ are $C_1$–$C_2$alkylene which is unsubstituted or substituted by $C_1$–$C_6$alkyl or $C_1$–$C_6$alkoxy.

9. A formulation according to claim 8, wherein $R_1$ and $R_2$ are a radical of formula —CHR$_a$—CHR$_b$—, wherein $R_a$ and $R_b$ are each independently of the other H or $C_1$–$C_6$alkyl.

10. A formulation according to claim 9, wherein the structural unit of formula I is a radical of formula

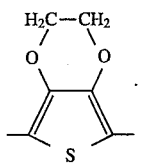

11. A formulation according to claim 1, which contains per structural unit of the polythiophene preferably 0.1 to 0.9 structural units containing sulfated alcohol groups

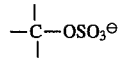

and/or sulfonatoalkylated alcohol groups

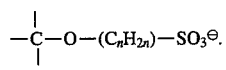

12. A formulation according to claim 11, which contains 0.1 to 0.6 structural units.

13. A formulation according to claim 1, wherein the group —($C_nH_{2n}$)— is linear or branched $C_3$–$C_8$alkylene containing 3 to 5 carbon atoms in the carbon chain.

14. A formulation according to claim 13, wherein the group —($C_nH_{2n}$)— is linear $C_3$–$C_5$alkylene.

15. A formulation according to claim 14, wherein the group —($C_nH_{2n}$)— is trimethylene or tetramethylene.

16. A formulation according to claim 1, wherein a salt form of the thermoplastic polymer containing sulfated alcohol groups in salt form

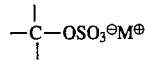

and/or sulfonatoalkylated alcohol groups in salt form

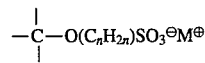

has a glass transition temperature of $-100°$ to $350°$ C., measured by the DSC method, wherein $M^\oplus$ is an alkali metal cation or an ammonium cation.

17. A formulation according to claim 1, wherein the degree of polymerisation of the thermoplastic polymer is from 5 to 10 000.

18. A formulation according to claim 1, wherein the alcohol groups in the thermoplastic polymer are completely sulfated and/or sulfonatoalkylated.

19. A formulation according to claim 16, wherein the salt form of the thermoplastic polymer contains unsubstituted and substituted alcohol groups, wherein the substituted alcohol groups are sulfated alcohol groups

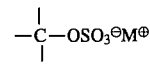

and/or sulfonatoalkylated alcohol groups

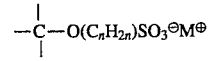

and wherein the ratio of unsubstituted to substituted alcohol groups in the themoplastic polymer is from 50:1 to 1:50.

20. A formulation according to claim 19, wherein the salt form of the thermoplastic polymer contains 5 to 100% molar of structural units of sulfated alcohol groups

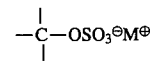

and/or sulfonatoalkylated alcohol groups

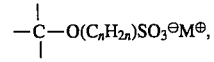

the remaining structural units being corresponding hydroxylated or non-hydroxylated structural units.

21. A formulation according to claim 1, wherein the sulfated and/or sulfonatoalkylated alcohol groups are present as secondary groups

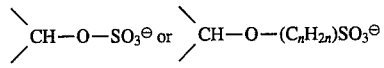

or as tertiary groups

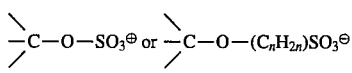

in the polymer backbone; or in side groups of the polymer as terminal primary groups —$CH_2$—O—$SO_3^{\ominus}$ or —$CH_2$—O—$(C_nH_{2n})SO_3^{\ominus}$, or as secondary groups

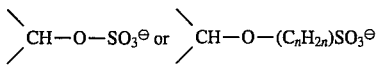

or as tertiary groups

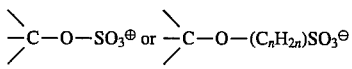

positioned centrally in the chain.

22. A formulation according to claim 1, wherein the thermoplastic polymers are derived from polymers or mixtures thereof which contain different hydroxyl groups, selected from the group consisting of polyesters, polyester amides, polycarbonates and polyimides obtained from hydroxyl-group containing monomers; saponified polymers of vinyl esters or ethers; hydroxylated polydiolefins as well as their copolymers with olefinic monomers; polyacrylates or polymethacrylates containing hydroxyalkyl radicals in the ester moiety; polysiloxanes containing hydroxyalkyl groups; reduced polyketones or copolymers thereof; polyethers of glycidyl compounds and diols; polyvinyl phenols or copolymers of vinyl phenols and olefinic comonomers; as well as copolymers of vinyl alcohol, or hydroxyalkyl-containing acrylates or methacrylates, or hydroxylated diolefins with ethylenically unsaturated comonomers.

23. A formulation according to claim 22, wherein the sulfated and/or sulfonatoalkylated thermoplastic polymers are derived from polymers selected from the group consisting of polyadducts of glycidyl compounds containing on average more than one epoxy group with a diol; homopolymers and copolymers of hydroxyalkyl acrylates and methacrylates; homopolymers and copolymers of butadiene, isoprene and chloroprene in which the double bonds are hydroxylated; polyimides of hydrogenated ketotetracarboxylic acids, especially benzophenonetetracarboxylic acids; hydroxyalkyl polysiloxanes; and polyesters, polyamides, polyurethanes and polyimides from $C_4$–$C_{12}$alkenylenediols or $C_4$–$C_{12}$alkenylenediamines in which the double bond is hydroxylated.

24. A formulation according to claim 22, wherein the thermoplastic polymer is either sulfated or sulfonatoalkylated.

25. A formulation according to claim 1, wherein the thermoplastic polymer is an at least partially sulfated and/or sulfonatoalkylated polyadduct of a) a glycidyl compound containing on average more than epoxy group and b) a diol that contains

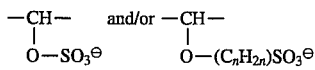

groups in the polymer chain, wherein the group —$C_nH_{2n}$— is as defined in claim 1.

26. A formulation according to claim 25, wherein the polyadduct contains a) 100 to 5% molar of identical or different structural units of formula II and/or IIa

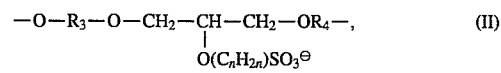

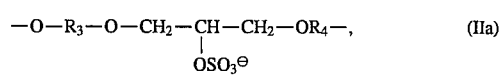

and b) 95 to 0% molar of identical or different structural units of formula III

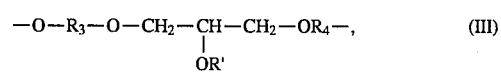

based on the polyadduct, wherein $R_3$ and $R_4$ are each independently of the other the radical of a diol containing aliphatic or aromatic diol groups and lacking two hydroxyl groups, and R' is H, $C_1$–$C_{20}$alkyl, $C_1$–$C_{20}$acyl or aminocarbonyl which is N-substituted by a $C_1$–$C_{20}$hydrocarbon radical.

27. A formulation according to claim 26, wherein R' in formula (III) is H.

28. A formulation according to claim 26, wherein $R_3$ and $R_4$ are identical radicals.

29. A formulation according to claim 26, wherein $R_3$ and $R_4$ defined as a radical containing aliphatic diol groups is linear or branched $C_2$–$C_2$alkylene, $C_3$–$C_8$cycloalkylene, $C_1$–$C_4$alkyl-$C_5$–$C_8$cycloalkylene, cyclohexylmethylene or cyclohexyldimethylene.

30. A formulation according to claim 26, wherein $R_3$ and $R_4$ are each independently of the other a radical of formula IV

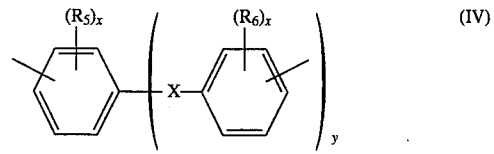

wherein X is a direct bond, $C_1$–$C_4$alkylene, $C_2$–$C_{12}$alkylidene, $C_5$–$C_8$cycloalkylidene, —O—, —S—, —SO—, —$SO_2$—, —CO—, —$CO_2$—, —N($C_1$–$C_4$alkyl) or —Si($CH_3$)$_2$, $R_5$ and $R_6$ are each independently of the other H, halogen, $C_1$–$C_4$alkyl or $C_1$–$C_4$alkoxy, and x is 1 or 2 and y is 0 or 1.

31. A formulation according to claim 30, wherein X is a direct bond, methylene, ethylene, $C_2$–$C_6$alkylidene, cyclohexylidene or cyclopentylidene, —O— or —S—.

32. A formulation according to claim 30, wherein $R_5$ and $R_6$ are H or methyl and y is 1.

33. A formulation according to claim 26, wherein $R_3$ and $R_4$ are the radical

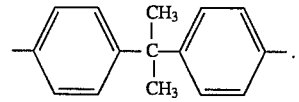

34. A formulation according to claim 1, wherein the thermoplastic polymer is an at least partially sulfated and/or sulfonatoalkylated polyvinyl alcohol or sulfated and/or sulfonatoalkylated polyvinyl alcohol copolymer containing

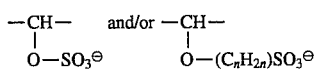

groups.

35. A formulation according to claim 34, wherein the thermoplastic polymer is a sulfated and/or sulfonatoalkylated polyvinyl alcohol copolymer.

36. A formulation according to claim 35, wherein the polyvinyl alcohol copolymer contains a) 90 to 5% molar of structural units of formula V and/or Va

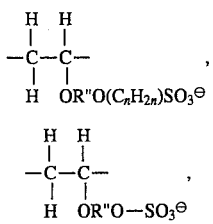

and b) 95 to 10% molar of identical or different structural units of formula VI

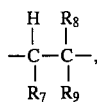

wherein $R_7$ is H, $C_1$–$C_6$alkyl, —COOR$_{10}$ or —COO$^\ominus$, $R_8$ is H, F, Cl, CN or $C_1$–$C_6$alkyl, and $R_9$ is H, OH, —R"OH, F, Cl, CN, $R_{10}$—O—, $C_1$–$C_{12}$alkyl, —COO$^\ominus$, —COOR$_{10}$, —OCO—R$_{10}$, methylphenyl or phenyl, where $R_{10}$ is $C_1$–$C_{18}$alkyl, $C_5$–$C_7$cycloalkyl, ($C_1$–$C_{12}$alkyl)-$C_5$–$C_7$cycloalkyl, phenyl, ($C_1$–$C_{12}$alkyl)phenyl, benzyl or ($C_1$–$C_{12}$alkyl)benzyl, and R" is linear or branched $C_2$–$C_{18}$alkylene, poly($C_2$–$C_6$oxaalkylene) containing 2 to 6 oxaalkylene units.

37. A formulation according to claim 36, wherein the copolymer contains 60 to 10% molar of structural units of formula IV, and 40 to 90% molar of structural units of formula V.

38. A formulation according to claim 36, wherein R" as alkylene contains 2 to 12 carbon atoms, and R" defined as poly(oxaalkylene) contains 2 to 4 oxaalkylene units containing 2 to 4 carbon atoms in the alkylene moiety.

39. A formulation according to claim 36, wherein $R_7$ is H, $R_8$ is H, F, Cl, methyl or ethyl, and $R_9$ is H, OH, F, Cl, CN, $C_1$–$C_4$alkyl, $C_1$–$C_6$alkoxy, —COO—$C_1$–$C_6$alkyl, —OOC—$C_1$–$C_6$alkyl or phenyl.

40. A formulation according to claim 39, wherein in formula (VI) $R_7$ is H, $R_8$ is H or methyl, and $R_9$ is H, OH, CN, methyl, OCH$_3$ or —COOCH$_3$.

41. A formulation according to claim 36, which contains 20 to 60% molar of structural units of formula V, 50 to 40% molar of structural units of formula —CH$_2$—CH$_2$— and 0 to 50% molar of structural units of formula —CH$_2$—CH(OH)—, the sum of the molar percentages being 100 percent.

42. A formulation according to claim 1, wherein the thermoplastic polymer is a sulfated and/or sulfonatoalkylated polymer of a partially hydroxylated polybutadiene, chloroprene or polyisoprene.

43. A formulation according to claim 42, wherein the thermoplastic polymer contains 5 to 100% molar of structural units of formulae VII and/or VIIa

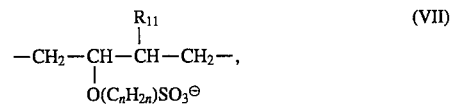

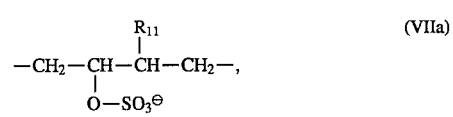

and 0 to 95% molar of structural units of formulae VIII and/or VIIIa,

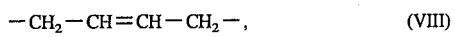

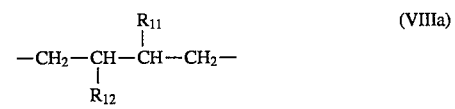

wherein $R_{11}$ and $R_{12}$ are each independently of the other H, OH or Cl, and the group —$C_nH_{2n}$— is as defined in claim 1.

44. A formulation according to claim 43, which contains 10 to 100% molar of structural units of formulae VII and/or VIIa, and 90 to 0% molar of structural units of formulae VIII and/or VIIIa.

45. A formulation according to claim 44, which contains 20 to 60% molar of structural units of formulae VII and/or VIIa, and 80 to 40% molar of structural units of formulae VIII and/or VIIIa.

46. A formulation according to claim 43, wherein $R_{11}$ is Cl or H and $R_{12}$ is H.

47. A formulation according to claim 1, wherein the film-forming thermoplastic polymer contains a) 100 to 50% molar of identical or different structural units of formula II and/or IIa

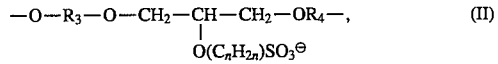

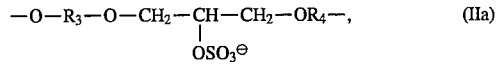

and b) 0 to 50% molar of identical or different structural units of formula III

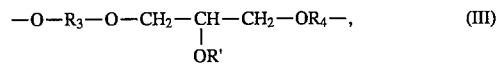

based on the polyadduct, wherein $R_3$ and $R_4$ are each independently of the other the radical of a diol lacking two hydroxyl groups and containing aliphatic or aromatic diol groups, and R' is H, $C_1$–$C_{20}$alkyl, $C_1$–$C_{20}$acyl or aminocarbonyl which is N-substituted by a $C_1$–$C_{20}$hydrocarbon radical.

48. A formulation according to claim 47, wherein the polymer contains 60 to 100% molar of structural units of formulae II and/or IIa, and 40 to 0% molar of structural units of formula III.

49. A formulation according to claim 48, wherein the polymer contains 60 to 90% molar of structural units of formulae II and/or IIa, and 40 to 10% molar of structural units of formula III.

50. A formulation according to claim 47, wherein R' is H.

51. A formulation according to claim 47, which contains a polythiophene in oxidised polycationic form and structural repeating units of formula I

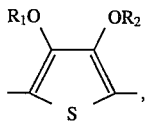 (I)

$R_1$ and $R_2$, taken together, are methylene or the radical —$CHR_a$—$CHR_b$—, wherein $R_a$ and $R_b$ are each independently of the other H, methyl or ethyl.

52. A formulation according to claim 51, wherein $R_a$ and $R_b$ are each independently of the other H.

53. A formulation according to claim 47, wherein $R_3$ and $R_4$ are each independently of the other a radical of formula IV

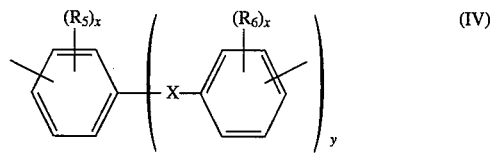 (IV)

wherein X is a direct bond, $C_1$-$C_4$alkylene, $C_2$-$C_{12}$alkylidene, $C_5$-$C_8$cycloalkylidene, —O—, —S—, —SO—, —SO_2—, —CO—, —CO_2—, —N($C_1$-$C_4$alkyl) or —Si(CH_3)_2, $R_5$ and $R_6$ are each independently of the other H, halogen, $C_1$-$C_4$alkyl or $C_1$-$C_4$alkoxy, and x is 1 or 2, and y is 0 or 1.

54. A formulation according to claim 53, wherein X is a direct bond, methylene, ethylene, $C_2$-$C_6$alkylidene, cyclohexylidene or cyclopentylidene, —O— or —S—.

55. A formulation according to claim 53, wherein $R_5$ and $R_6$ are H or methyl and y is 1.

56. A formulation according to claim 53, wherein $R_3$ and $R_4$ are the radical

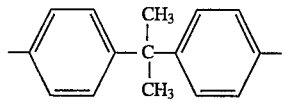

57. A composition according to claim 51, wherein the structural units of the polythiophene correspond to radicals of formula

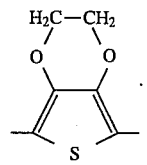

58. A formulation comprising
 a) a thermoplastic or thermosetting resin or a structurally crosslinked polymer in which is incorporated
 b) an electrically conductive, finely particulate filler obtained from a powder formulation according to claim 1.

59. A formulation according to claim 58, wherein the amount of component b) is 0.1 to 90% by weight, based on component a).

60. A formulation according to claim 59, wherein the amount of component b) is 5 to 80% by weight.

61. A moulding material consisting of a powder formulation as claimed in claim 1.

* * * * *